Dec. 30, 1952   H. C. STAFFORD   2,623,344
SEED STRIPPER

Filed June 2, 1950   2 SHEETS—SHEET 1

HAROLD C. STAFFORD INVENTOR

BY Edward H Connors

AGENT

Dec. 30, 1952 H. C. STAFFORD 2,623,344
SEED STRIPPER

Filed June 2, 1950 2 SHEETS—SHEET 2

INVENTOR
HAROLD C. STAFFORD

BY *Edward O'Connor Jr*

AGENT

Patented Dec. 30, 1952

2,623,344

UNITED STATES PATENT OFFICE 2,623,344

SEED STRIPPER

Harold C. Stafford, Kansas City, Mo.

Application June 2, 1950, Serial No. 165,735

2 Claims. (Cl. 56—129)

This invention relates to novel improvements in seed stripping machines and has for its primary object to provide a manually propelled seed stripping and collecting machine, which is adjustable in height and which is equipped with means for ejecting the seeds into a removable drawer slidably mounted in the lower portion of the machine.

Another important object of this invention is to provide a seed stripper which is provided with power-driven stripping means, including complementary movable and fixed teeth, which strip the seeds from the stalks in a quick and efficient manner.

Another important object of this invention is to provide guide means for forcing the growing stalks into the path of the stripping means, without bending or breaking the stalks or damaging the seed tops.

Another important object of this invention is to provide means for creating a vacuum in the interior of the seed stripper to convey the stripped seeds into the removable drawer.

Yet another important object of this invention is to provide a compact and easily maneuverable machine, which is lightweight and is equipped with bumpers to ward off foreign objects and prevent the objects from damaging the stripping teeth.

These and ancillary objects and structural features of merit are attained by this invention, the preferred embodiment of which is set forth in the following description and illustrated in the accompanying drawings, wherein.

Figure 1:
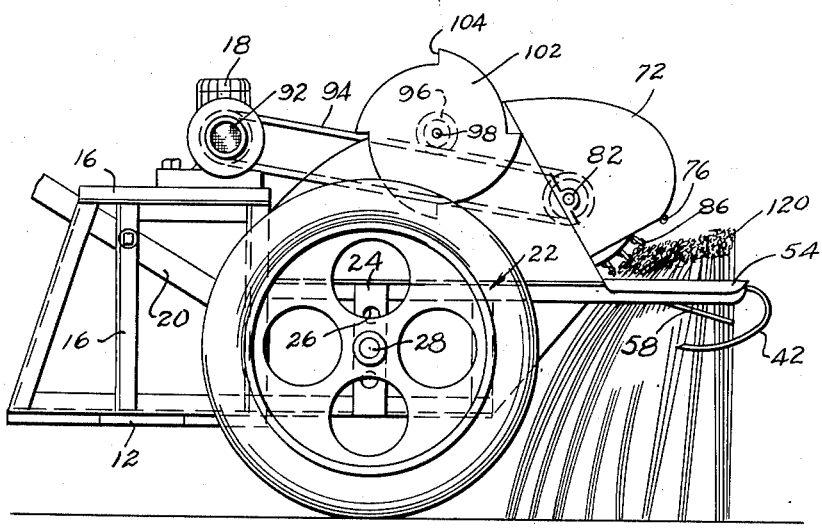
Figure 1 is a side elevational view of a machine constructed in accordance with the principles of this invention.

With reference to the accompanying drawings, the seed stripper 10, in its exemplary form, includes a base 12 from which a supporting structure 14 forwardly projects. A framework 16 is mounted on the base and a prime mover 18 is mounted thereon. Handlebars 20 are secured to the opposing sides of the framework and may be adjustable, if desired.

Side frames 22 are secured to the opposing edges of the support 14 and project upwardly therefrom. Each of the side frames includes a vertical bar 24, which is formed with vertically spaced openings 26 to receive the axles 28 of wheels 30, whereby the wheels are vertically adjustable on the frame. A hopper 32 is mounted on the support 14 between the opposing side frames 22 and is formed with a flat bottom 34 and an upwardly and forwardly slanting front wall 36. The hopper is also provided with opposing vertical side walls and an open rear wall.

Elongated bars or angle irons 38 and 40 are mounted on the side frames 22 and project forwardly thereof in parallelism. U-shaped inwardly and rearwardly directed flexible rods 42 and 44 are mounted on the outer ends of the bars 38 and 40 and form protective bumpers for the machine. Guide members 46 and 48 are mounted on the bars rearwardly of the bumpers and are formed with outwardly curved inner edges 50 and 52. The guide members consist of metal sheets having one edge 54 crimped over the extending bars 38 and 40, as seen in Figure 1.

Figure 2:
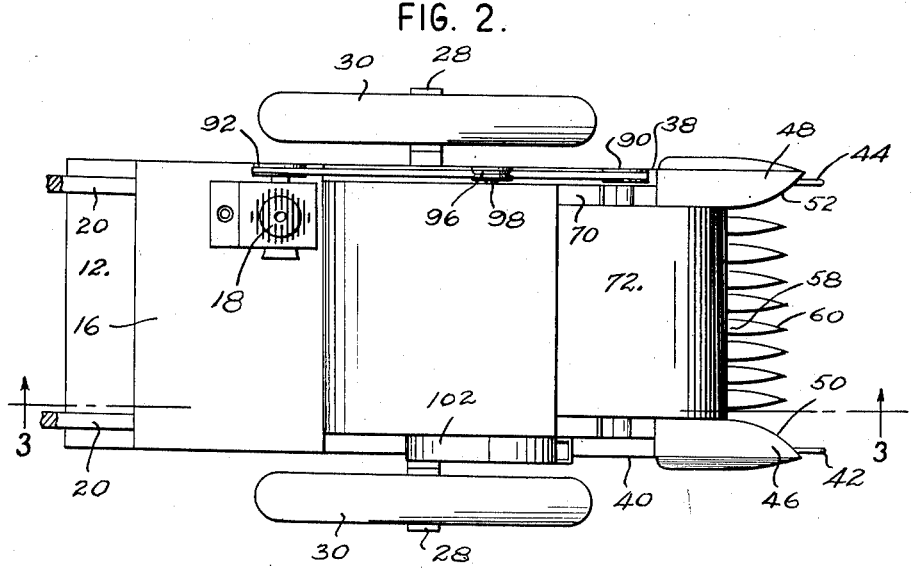
Figure 2 is a top plan view thereof.

The upper edge of the front wall 36 of the hopper is rolled to form a reinforced inturned edge 56. Fixed teeth 58, which terminate at their outer ends in faired points 60, are mounted on the reinforced edge 56 in transversely spaced fashion and have their inner ends 62 bent downwardly on and secured to the reinforced edge 56 of the front wall 36. The teeth project forwardly and slightly downwardly in uniformity from the hopper and are arranged between the guides 46 and 48, as seen in Figure 2.

Figure 3:
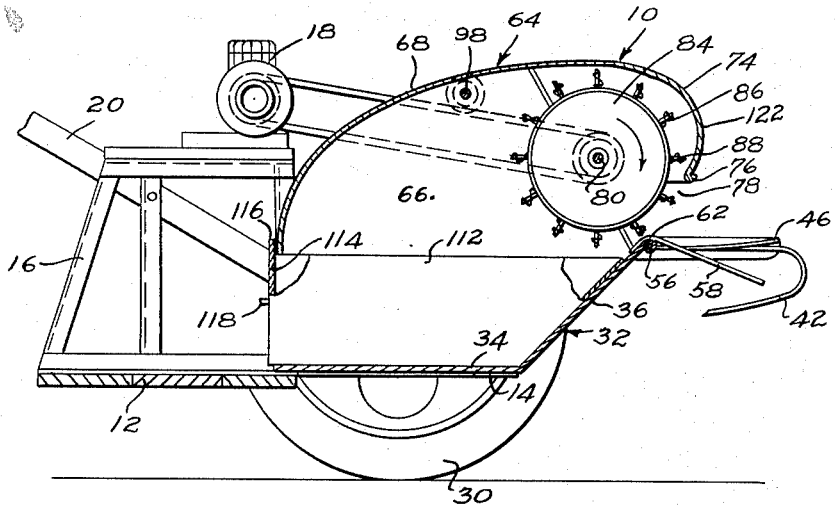
Figure 3 is a longitudinal vertical sectional view taken on line 3—3 of Figure 2.
Figure 4:
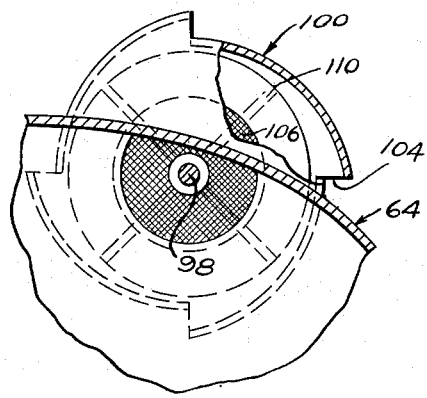
Figure 4 is an enlarged sectional view of the blower unit mounted on one side of the housing.

A housing 64 is mounted on the hopper 32 and is formed with opposing side walls 66 and a concavo-convex upper wall 68. The side walls 66 of the housing are inturned to form shoulders 70 and a front projection 72 is defined thereby, the projecting portion 72 being integral with the housing and constituting a reduced prolongation thereof. The upper curved wall 74 of the projecting portion of the housing overlies the front wall of the hopper and terminates in a rolled edge 76, which overlies the teeth 58 and is positioned between the guides 46 and 48 and spaced upwardly therefrom. An opening 78 for the stripped seeds is defined by the reinforced edges 56 and 76, as seen in Figure 3.

A shaft 80 is rotatably journaled in bearings 82 mounted on the shoulders 70, and a cylinder 84 is fixed on the shaft for clockwise rotation therewith. The outer periphery of the cylinder is provided at circumferentially spaced points with radially projecting sets of teeth 86, which are formed with spirally arranged ribs 88.

The cylinder is powered by means of a pulley 90 keyed on the projecting end of the shaft 80 and connected to a drive pulley 92 on the driveshaft of the motor 18 by a belt 94.

A pulley 96 engages the back of the belt and is fixed on a shaft 98, which is transversely journaled in the housing 64. The pulley 96 not only functions as a belt tightener to effect an efficient drive between the motor 18 and the shaft 80, but also functions as a source of power for actuating a blower unit 100. The blower unit includes a housing 102, which is mounted on one side of the housing 64 and provided with tangential openings 104. The blower housing 102 communicates with the interior of the housing 64 by means of a screened opening 106. Vanes 110 are radially fixed on the shaft 98 and are rotatably housed within the housing 102 to create a vacuum in the housing 64. The screened opening prevents the seeds from entering the housing 102.

A tray or drawer 112 is slidably mounted in the hopper 32 and is provided with a vertical rear wall 114 having a projecting upper edge 116, which is adapted to abut against the rearward edge of the top wall 68 of the housing 64, as seen in Figure 3. A handle 118 is formed on the rear wall for convenience in sliding the drawer rearwardly onto the base 12.

In use, the stripper is manually propelled through a grain or wheat field by an operator, who grasps the handlebars 20 and moves behind the stripper. The cylinder 84 is rotated by means of the motor 18 through the belt drive 94, and the teeth 86 projecting radially from the cylinder strip the seeds from the tops of the stalks 120. The stalks are moved inwardly between the fixed teeth or tines by the guides 46 and 48 and are held in vertical positions so that the seeds can be stripped therefrom, as seen clearly in Figure 1.

As the cylinder revolves in the projecting portion 72 of the housing, an air swirl is created by the teeth, and the air swirl is directed against the front portion 122 of the front wall 74 and upon impinging against the front portion 122, the air currents are deflected rearwardly into the drawer 112. This source of air aids in directing the stripped seeds into the drawer. Also, a vacuum is created in the housing 64 by means of blower unit 100, which is driven by the belt 94 through the belt tightener pulley 96.

When the drawer 112 becomes full, it is easily slid rearwardly onto the base 12 or entirely removed to enable the seeds to be dumped therefrom.

Having thus described the invention, what is claimed is:

1. A seed stripping machine for removing the seeds from the tops of growing stalks, comprising a wheel mounted vertically adjustable frame, a housing mounted on the frame and having a transverse opening in its front and rear ends, a rotary cylinder mounted transversely in the housing, ribbed teeth radially projecting from the cylinder and movable past the opening in the front end of the housing, drive means for said cylinder carried by the frame, a series of fixed teeth projecting forwardly from the front of the housing at the opening therein, guide means positioned at each end of the series of teeth and carried by the frame, whereby the growing stalks are urged into engagement of the fixed teeth and held upright thereby so that the seeds can be stripped therefrom by the rotating ribbed teeth, and a removable depository for the seeds slidably mounted on the frame and normally positioned within the housing and in communication with the opening in the front thereof, said housing having an outwardly bulged front end on the top wall thereof overlying in advance of and spaced substantially from the cylinder and the front end terminating slightly below the center of the axis of the cylinder and in spaced relation thereto, whereby air currents formed by the rotating teeth impinge against the bulged end and are deflected rearwardly into the depository to aid in forcing the stripped seeds into the depository.

2. A seed stripping machine for removing the seeds from the tops of growing stalks comprising a wheel mounted vertically adjustable frame, a housing mounted on the frame and having a transverse opening in its front and rear ends, a rotary cylinder mounted transversely in the housing, ribbed teeth radially projecting from the cylinder and movable past the opening in the front end of the housing, drive means for said cylinder carried by the frame, a series of fixed teeth projecting forwardly and slightly downwardly from the front of the housing at the opening therein, guide means positioned at each end of the series of teeth and carried by the frame, whereby the growing stalks are urged into engagement of the fixed teeth and held upright thereby so that the seeds can be stripped therefrom by the rotating ribbed teeth, resilient bumper rods carried by the frame at each end of the series of fixed teeth and extending beyond the teeth, and a removable depository for the seeds slidably mounted on the frame and normally positioned within the housing and in communication with the opening in the front thereof, and vacuum means carried by the housing and driven by the drive means for the cylinder for collecting the seeds from the front opening and forcing them into the depository.

HAROLD C. STAFFORD.

REFERENCES CITED

The following references are of record in the file of this patent:

UNITED STATES PATENTS

| Number | Name | Date |
| --- | --- | --- |
| 32,416 | Decker | May 28, 1861 |
| 276,148 | Anunsen | Apr. 24, 1883 |
| 394,989 | Miller | Dec. 25, 1888 |
| 656,830 | Whitney et al. | Aug. 28, 1900 |
| 1,261,202 | Barghausen | Apr. 2, 1918 |
| 1,297,349 | Herr | Mar. 18, 1919 |
| 1,365,503 | Kocher | Jan. 11, 1921 |
| 1,449,869 | Novak | Mar. 27, 1923 |
| 2,499,047 | Wilkins | Feb. 28, 1950 |